US012180017B2

(12) United States Patent
Walker et al.

(10) Patent No.: US 12,180,017 B2
(45) Date of Patent: Dec. 31, 2024

(54) AUTOMATED DE-STACKING SYSTEM AND METHOD

(71) Applicant: LCE Technology, LLC, St. Petersburg, FL (US)

(72) Inventors: Thomas Walker, St. Petersburg, FL (US); Richard Walker, St. Petersburg, FL (US); Solomon Plange, Palm Harbor, FL (US); Chris Walker, Apollo Beach, FL (US)

(73) Assignee: LCE Technology, LLC, St. Petersburg, FL (US)

( * ) Notice: Subject to any disclaimer, the term of this patent is extended or adjusted under 35 U.S.C. 154(b) by 121 days.

(21) Appl. No.: 17/865,807

(22) Filed: Jul. 15, 2022

(65) Prior Publication Data

US 2023/0017681 A1 Jan. 19, 2023

Related U.S. Application Data

(60) Provisional application No. 63/222,844, filed on Jul. 16, 2021.

(51) Int. Cl.
| | | |
|---|---|---|
| *B65G 59/02* | (2006.01) | |
| *B65G 47/06* | (2006.01) | |
| *B65G 47/90* | (2006.01) | |
| *B65H 3/00* | (2006.01) | |
| *B65G 15/00* | (2006.01) | |

(52) U.S. Cl.
CPC ............ *B65G 47/90* (2013.01); *B65G 47/06* (2013.01); *B65G 59/02* (2013.01); *B65G 15/00* (2013.01)

(58) Field of Classification Search
CPC ...... B65G 47/57; B65G 47/841; B65G 59/02; B65G 2201/0202; B26D 7/0625; B26D 7/32; B26D 2210/02; B65H 3/00
USPC .............. 198/510.1; 414/796.4, 796.5, 796.9
See application file for complete search history.

(56) References Cited

U.S. PATENT DOCUMENTS

| | | | | |
|---|---|---|---|---|
| 5,112,181 A | * | 5/1992 | Rasmussen ............. | B65B 23/08 414/416.07 |
| 5,199,845 A | * | 4/1993 | Hirashima ............. | B65G 47/90 414/744.1 |
| 5,328,322 A | * | 7/1994 | Neri ....................... | B65G 61/00 414/796.9 |
| 6,227,793 B1 | * | 5/2001 | Knighten ............. | B25J 15/0253 414/744.5 |

(Continued)

FOREIGN PATENT DOCUMENTS

DE 1800765 * 10/2006

*Primary Examiner* — Douglas A Hess
(74) *Attorney, Agent, or Firm* — AVEK IP, LLC

(57) ABSTRACT

An automated system for de-stacking a plurality of stacked objects, the automated system comprising a lift assembly and a grabber assembly. The lift assembly comprises a tower, and a number of electric motors. The tower is configured to rotate about a vertically-extending axis. One of the electric motors is configured to rotate the tower. Another one of the electric motors is configured to raise and lower the grabber assembly. The grabber assembly is configured to move with the tower as the tower rotates and comprises a claw and an electric motor. The claw is configured to grasp the objects individually. The electric motor of the grabber assembly is configured to actuate the claw. The first, second, and third electric motors are configured to operate in a refrigerated environment.

18 Claims, 6 Drawing Sheets

(56) References Cited

U.S. PATENT DOCUMENTS

| | | | | |
|---|---|---|---|---|
| 7,934,759 | B2* | 5/2011 | Weller | B65G 47/71 |
| | | | | 414/796.2 |
| 7,988,406 | B2* | 8/2011 | Schafer | B65G 1/1378 |
| | | | | 414/796.5 |
| 9,333,649 | B1* | 5/2016 | Bradski | B25J 19/00 |
| 9,359,150 | B2* | 6/2016 | Jodoin | B65G 47/90 |
| 9,498,887 | B1* | 11/2016 | Zevenbergen | B25J 15/0052 |
| 9,844,883 | B2* | 12/2017 | Genefke | B25J 15/0014 |
| 10,280,013 | B2* | 5/2019 | Gondoh | B65G 1/1378 |
| 10,343,857 | B2* | 7/2019 | Morency | B65G 61/00 |
| 10,710,860 | B2* | 7/2020 | Warren | B67B 7/15 |
| 10,906,186 | B2* | 2/2021 | Takahashi | B25J 15/0616 |
| 11,629,017 | B2* | 4/2023 | Gondoh | B65G 47/917 |
| | | | | 414/796.9 |
| 11,753,245 | B1* | 9/2023 | Schultz | B25J 11/00 |
| | | | | 414/274 |

* cited by examiner

AUTOMATED DE-STACKING SYSTEM AND METHOD

RELATED APPLICATIONS

This application is a regular utility non-provisional patent application and claims priority benefit with regard of U.S. Provisional Patent Application Ser. No. 63/222,844, entitled "ROBOTIC DE-NESTER," filed Jul. 16, 2021. The above-referenced provisional patent application is hereby incorporated by reference in its entirety.

BACKGROUND

The present invention relates generally to material handling systems. More specifically, embodiments of the present invention concern an automated system for shifting individual containers relative to a container stack.

A variety of aspects of embodiments of the present invention will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive. While the drawings do not necessarily provide exact dimensions or tolerances for the illustrated structures or components, the drawings are to scale with respect to the relationships between the components of the structures illustrated in the drawings.

SUMMARY

An embodiment of the invention is an automated de-stacking system operable to remove individual containers from a stack of nested containers. The automated system broadly comprises containers, a cage, a conveyor, a controller system, a powered lift assembly, and two opposing grabber assemblies. The control system, lift assembly, and grabber assemblies cooperatively provide a robotic assembly configured to selectively grasp and release containers.

The cage provides an enclosure, which defines an operating space therein to receive the lift assembly, grabber assemblies, and containers. The cage includes multiple upright walls and a door that permits ingress and egress relative to the operating space. Preferably, the cage also restricts access to components of the system during an operating cycle.

The conveyor is configured to receive containers during an operating cycle and advance the containers out of the drop location and away from the robotic assembly. The conveyor includes a support frame, rollers, an endless belt, and a motor configured to power the belt. The belt defines an inboard end near the tower and an opposing outboard end and presents an upper belt run that is configured to be advanced from the inboard end to the outboard end. The conveyor may also include a catch and a bump or other features configured to reorient the containers once they are placed on the conveyor and begin to advance on the conveyor. The motor may be configured so that actuation of the belt is linked to operation of the lift assembly. For example, the motor may be instructed to stop before a container is placed on the belt.

The control system includes a programmable logic controller (PLC) with a human machine interface (HMI) for operating the de-stacking system. The control system may also include wired or wireless communication elements for communicating with remote servers, control systems of other de-stacking systems or other material manipulation systems, or with user work devices.

The robotic assembly is operable to transfer containers between the container stack and the conveyor. Lift assembly of the robotic assembly supports both of the grabber assemblies and includes a base, a rotatable tower, and a servo motor configured to rotate the tower relative to the base about a vertical axis.

The tower includes a pair of upright tracks located on opposite sides of the tower to slidably engage respective grabber assemblies. In particular, the tracks permit the grabber assemblies to slide vertically relative to the tower for raising and lowering the grabber assemblies. The tower also includes chain drives associated with each of the tracks to drivingly shift the grabber assemblies along the respective tracks. Each chain drive includes a servo motor to power a respective chain and thereby position the corresponding grabber assembly. The tower (along with the grabber assemblies) is configured to rotate about a vertically-extending axis via a motor.

Each grabber assembly is used to selectively engage and disengage containers during operation. The grabber assemblies include a cantilevered support arm slidably attached to a respective one of the tracks of the tower. The grabber assemblies also include laterally extending claw supports, claws pivotally attached adjacent to respective ends of the claw supports, a servo motor, right angle gearbox, and linkage.

Each claw includes a pair of claw elements with inwardly-turned hooks located at a lowermost claw end of the claw to engage a container. An uppermost claw end of the claw is pivotally attached to the linkage and is pivotally attached to the claw support at a location spaced between the uppermost and lowermost ends. The uppermost end is configured to be laterally shifted by the linkage to produce corresponding lateral shifting of the lowermost claw end.

The linkage includes a rotatable drive wheel attached to an output shaft of the gearbox and a pair of links drivingly attached to the drive wheel. Rotation of the drive wheel in one direction causes both sets of claws to shift simultaneously so that the claws are closed to engage a container. Rotation of the drive wheel in the opposite direction causes both sets of claws to shift simultaneously so that the claws are opened for disengagement from a container. The linkage and claws may be non-backdrivable so that the claws can only be actuated via specific commands to the motor or other components. To that end, the grabber assemblies may include ratchet mechanisms, locking components, detents, or the like. Similarly, the gearbox may include a worm gear that can only turn via motor input. This prevents slippage and inadvertent, unauthorized, or premature release of the container.

For at least certain aspects of the present invention, the claws may be alternatively configured to engage the container. For instance, alternative embodiments of the grabber assembly may be configured to grab more than one container at a time (e.g., where the claws are configured to engage multiple stacked containers).

Robotic assembly preferably defines a docking station configured to receive the container cart with a stack of nested containers. The robotic assembly also defines a plurality of drop locations spaced about the base of the robotic assembly. The system is configured so that a conveyor may be located at any one of the drop locations to receive individual containers.

The automated system includes sensors that operably communicate with the controller for sensing location and/or movement of various system components and providing corresponding data to the controller. In the depicted embodiment, the system includes a cart photo sensor adjacent the docking station to sense whether the container cart in position for container removal. The system also includes container photo sensors adjacent the docking station to sense the number of containers nested in a container stack on the cart. The system further includes drop location sensors adjacent to each drop location to sense whether a container is positioned on a conveyor at the drop location.

The motors are electric motors for driving various components of the robotic system and each may be for example a servo motor with an absolute encoder. In one embodiment, the robotic assembly is devoid of any pneumatically powered motors. Importantly, the automated system (and the electric motors in particular) is configured to be operated in a refrigerated environment, unlike the pneumatically powered motors. However, for at least certain aspects of the present invention, one or more motors may be alternatively configured.

In operation, the automated system is configured to sense the location of the container cart and any containers located on the cart. The robotic assembly is then operated by the controller to pick up each of the containers one at a time and shift each container onto the conveyor. The robotic assembly uses one of the grabber assemblies to engage and grab an uppermost one of the stacked containers by cooperatively closing the claws onto the container. With the claws engaged, the robotic assembly is permitted to lift the container grasped by the claws. The lift assembly may rotate the tower and grabber assemblies about the vertical axis so that the engaged container is shifted to a position above the conveyor at the drop location. The robotic assembly may be selectively lowered onto the conveyor by the respective grabber assembly and the claws opened to release the container from the grabber assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
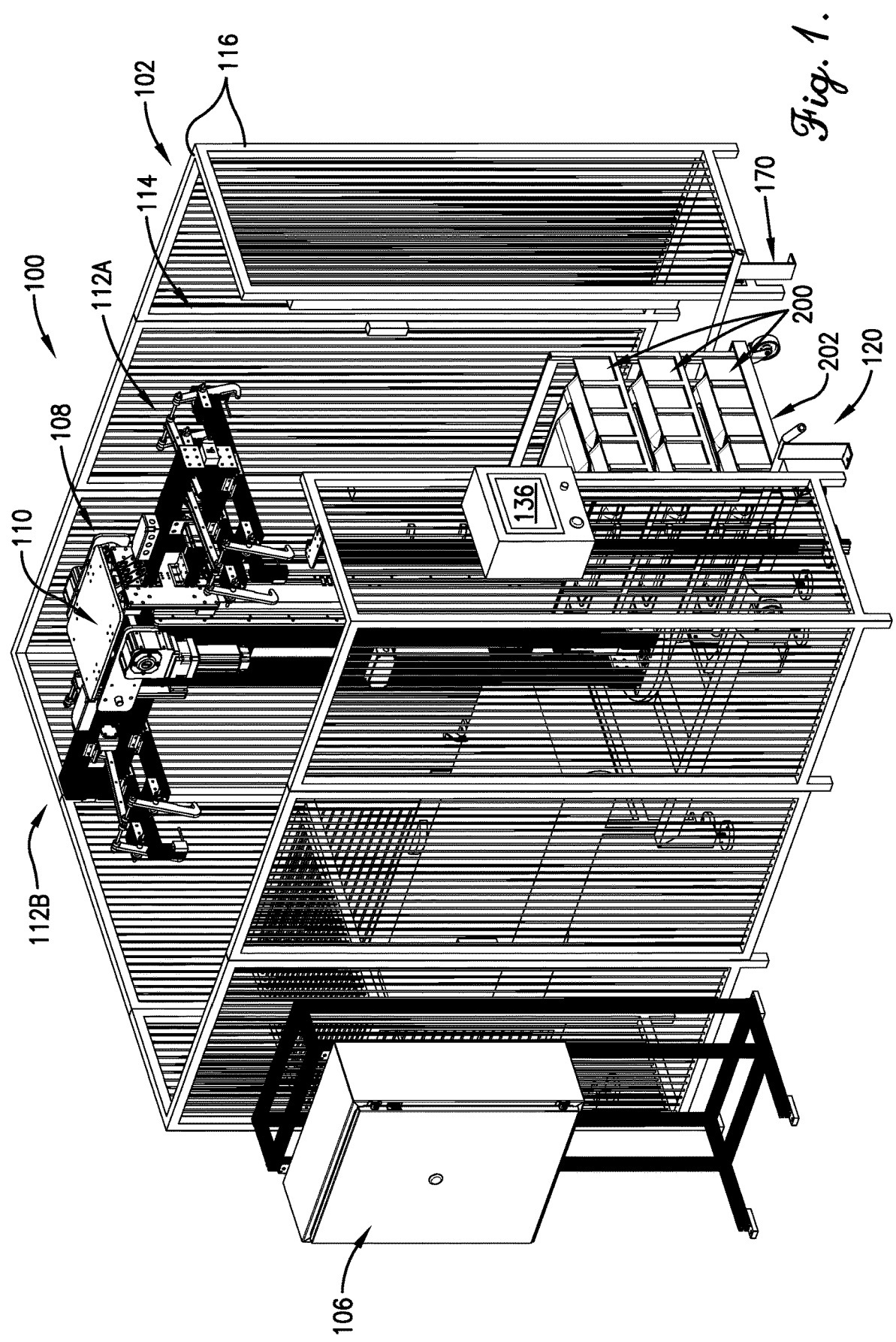
FIG. 1 is perspective view of an automated de-stacking system constructed in accordance with a preferred embodiment of the invention.
Figure 2:
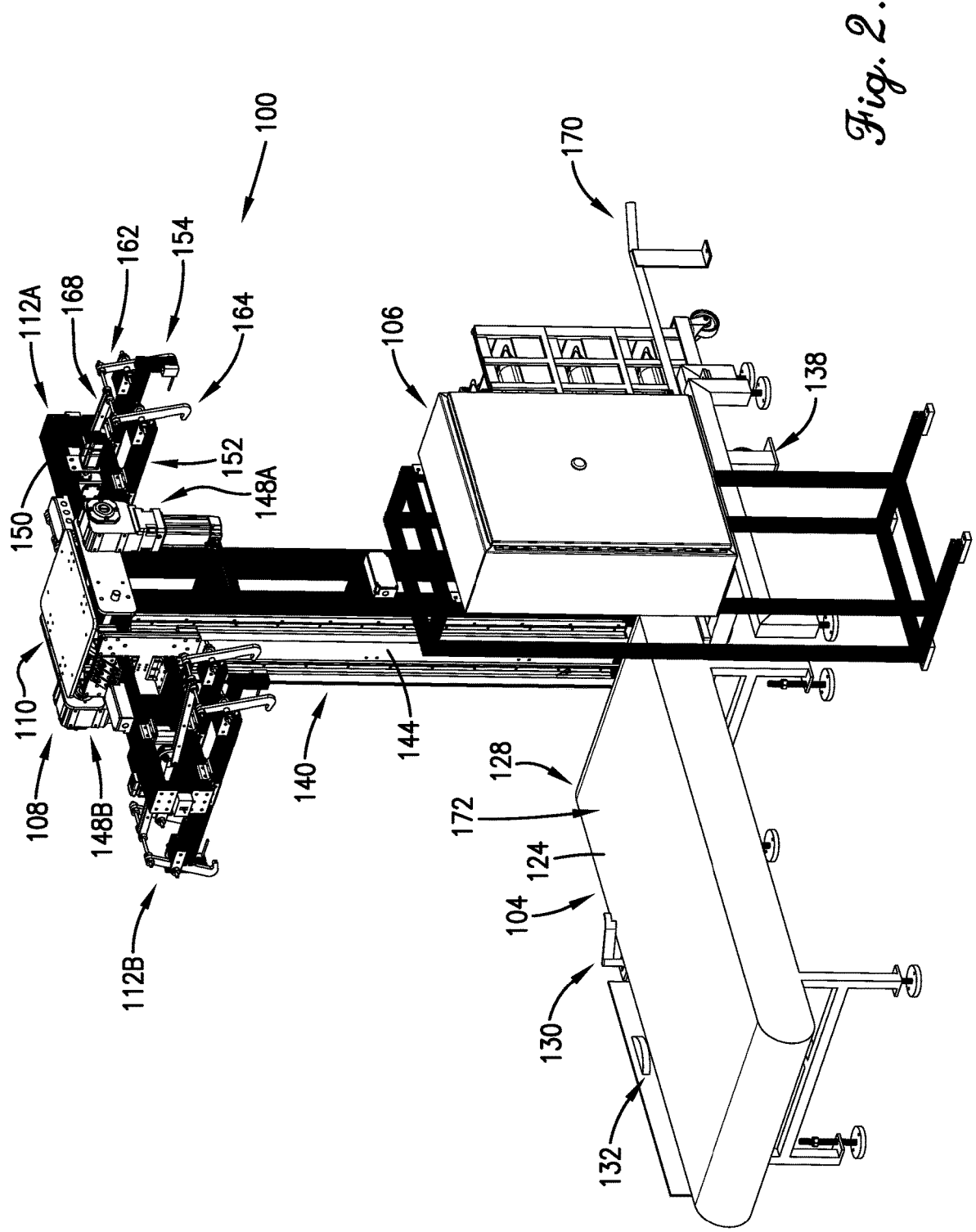
FIG. 2 is another perspective view of the automated de-stacking system of FIG. 1.
Figure 3:
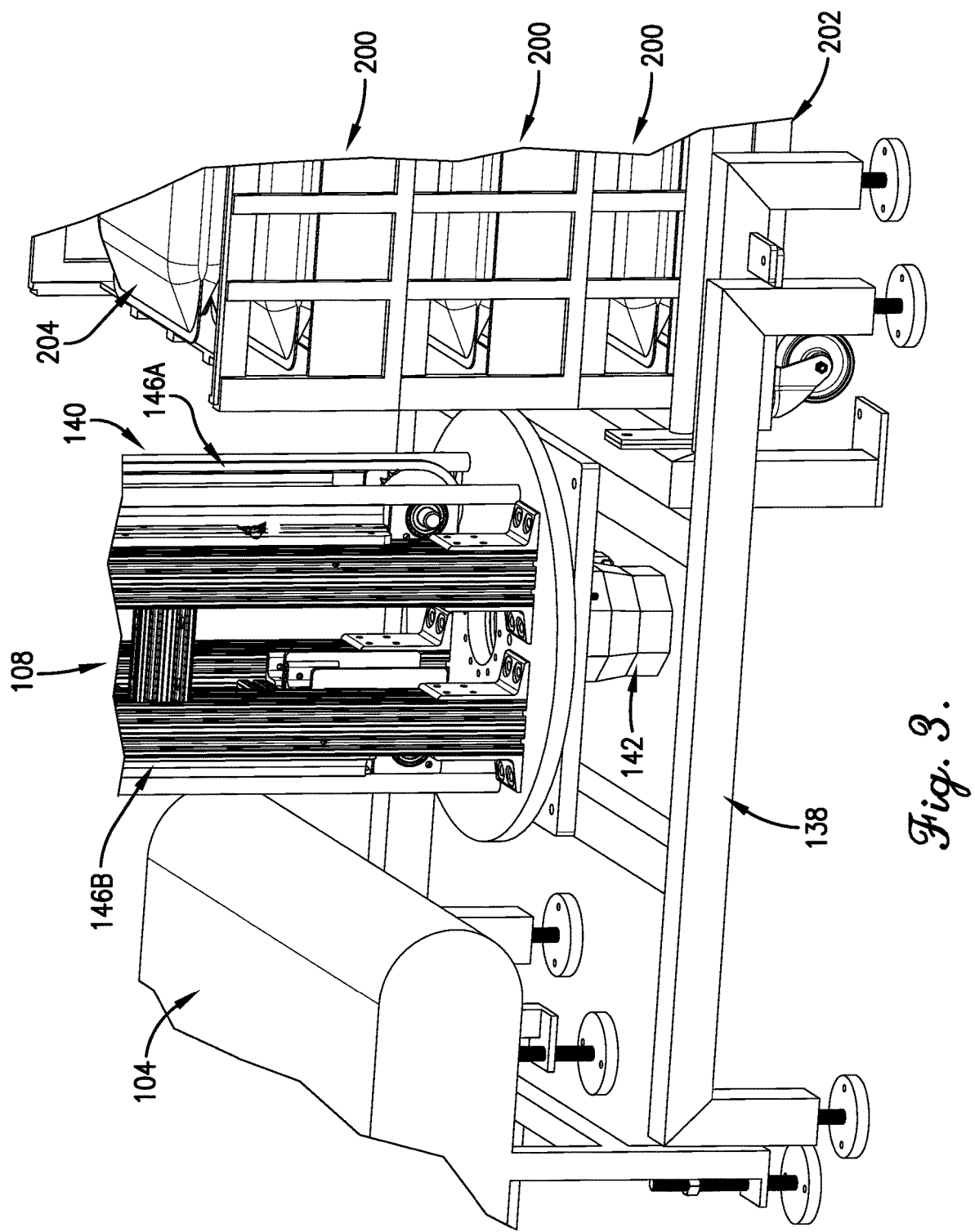
FIG. 3 is an enlarged perspective view of certain components of the automated de-stacking system of FIG. 1.
Figure 4:
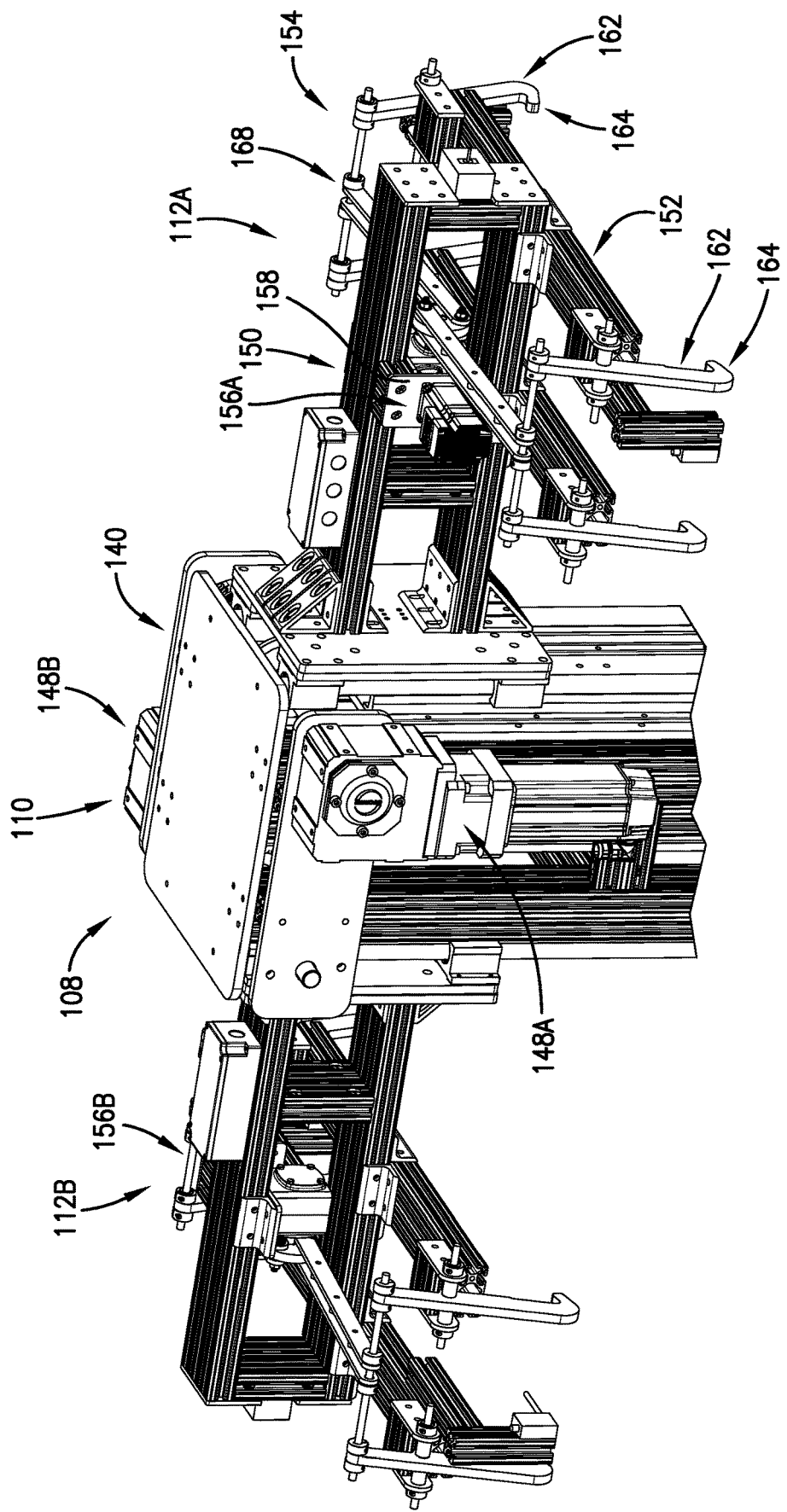
FIG. 4 is an enlarged perspective view of certain components of the automated de-stacking system of FIG. 1.
Figure 5:
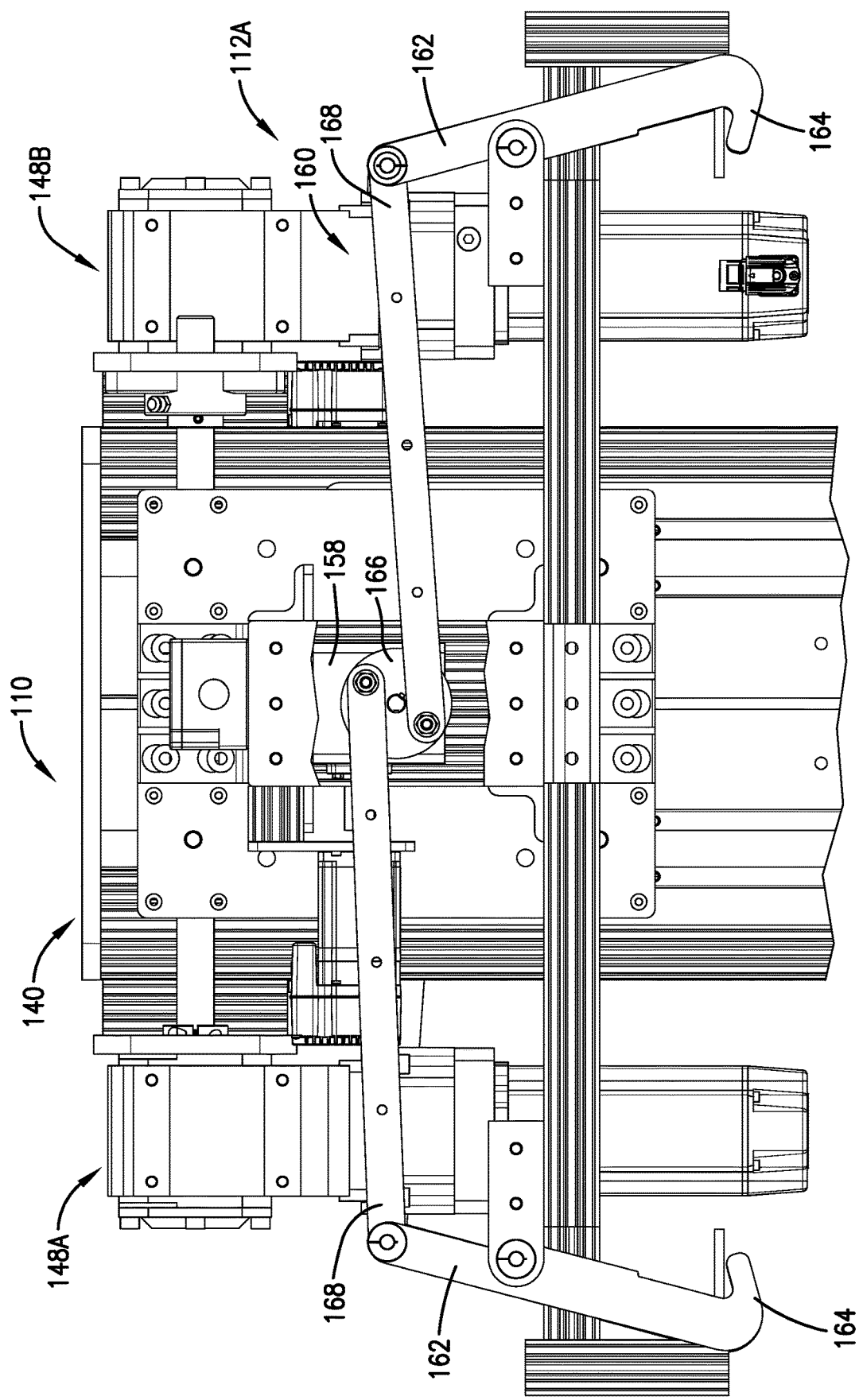
FIG. 5 is an enlarged side elevation view of certain components of the automated de-stacking system of FIG. 1.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. While the drawings illustrate, and the specification describes, certain preferred embodiments of the invention, it is to be understood that such disclosure is by way of example only. There is no intent to limit the principles of the present invention to the particular disclosed embodiments.

Turning to the drawing figures, an automated de-stacking system 100 constructed in accordance with an embodiment of the invention is illustrated. The de-stacking system 100 is operable to remove individual containers 200 from a stack of containers 200. The de-stacking system 100 broadly comprises containers 200, a cage 102, a conveyor 104, a control system 106, a robotic assembly 108 including a lift assembly 110, and two opposing grabber assemblies 112A,B. The control system 106, lift assembly 110, and grabber assemblies 112A,B cooperatively provide a robotic assembly 108 configured to selectively grasp from the stack and release containers 200 onto the conveyor 104. The robotic assembly 108 may use the grabber assemblies 112A,B to manipulate two containers 200 at the same time. An additional container may be on the conveyor 104 in proximity to the de-stacking system 100 while containers are being manipulated by the robotic assembly 108. The de-stacking system 100 may also be used to de-stack other objects such as blocks or products.

In the depicted embodiment, each container 200 comprises a tray configured to hold and transport a product, such as durable goods or nondurable goods (e.g., a perishable food item). In one embodiment, the goods may each be up to 120 pounds in weight. An exemplary container 200 includes a bottom and upright sides that define a chamber to receive the product and an open top. The container bottom preferably defines a bottom margin that is complementally sized and shaped so that the bottom can be nested within the open top of another container. A stack of nested containers 200 are operable to be supported on a rolling container cart 202 to move the stack into and out of a docking station of the de-stacking system 200. Preferably the de-stacking system 200 is configured to receive the container cart 202 with up to eight nested containers 200, although an alternative system may be configured to accommodate a larger number of containers 200. The containers 200 (or other objects) may be nested or may be stacked on shelves or ledges of a cabinet such that any one of the containers 200 can be removed from the stack without disturbing the remaining containers 200.

For at least certain aspects of the present invention, one or alternative containers may have an alternative configuration. For instance, one or more containers 200 may have a top that covers and encloses the chamber. It will be appreciated that the system may be configured to handle various types of containers, such as a basket, bucket, tub, box, cage, jug, bottle, pallet, etc.

The cage 102 provides an enclosure 114, which defines an operating space therein to receive the lift assembly 110, grabber assemblies 112A,B, and containers 200. The cage 102 includes multiple upright walls 116 and a door that permits ingress and egress relative to the operating space. Preferably, the cage 102 also restricts access to components of the system during an operating cycle.

The conveyor 104 is configured to receive containers 200 during an operating cycle and advance the containers 200 from a drop location 172 and away from the robotic assembly 108. The conveyor 104 includes a support frame, rollers, an endless belt 124, and a motor 126 configured to power the belt 124. The belt 124 defines an inboard end 128 near a tower (described below) of the robotic assembly 108 and an opposing outboard end and presents an upper belt run that is configured to be advanced from the inboard end 128 to the outboard end. The conveyor 104 may also include a catch 130 and a bump 132 or other features configured to reorient the containers 200 once they are placed on the conveyor 104 and begin to advance on the conveyor 104. For example, the catch 130 may engage and turn the container 200. The bump 132 may then release the tray from the catch 130. The motor 126 may be configured so that actuation of the belt 124 is linked to operation of the lift assembly 110. For example, the motor 126 may be instructed to stop before a container is placed on the belt 124.

For at least certain aspects of the present invention, the de-stacking system 100 may include a conveyor 104 that is alternatively configured. For example, the de-stacking system 100 may have a conveyor 104 or other container-guiding structure that is not powered (e.g., where the conveyor 104 is downwardly sloped so that gravity carries the container out of the cage 102). For some aspects of the present invention, the de-stacking system 100 may be devoid of a conveyor for receiving the container from the robotic assembly 108.

The cage 102 presents an opening 120 that permits the conveyor 104 to extend into and out of the operating space (enclosure 114). During use the conveyor 104 is configured to advance individual containers 200 out of the operating space for subsequent handling. The robotic assembly 108 defines the drop location 172 at which the conveyor 104 is located to receive containers 200 from the robotic assembly 108.

Figure 6:
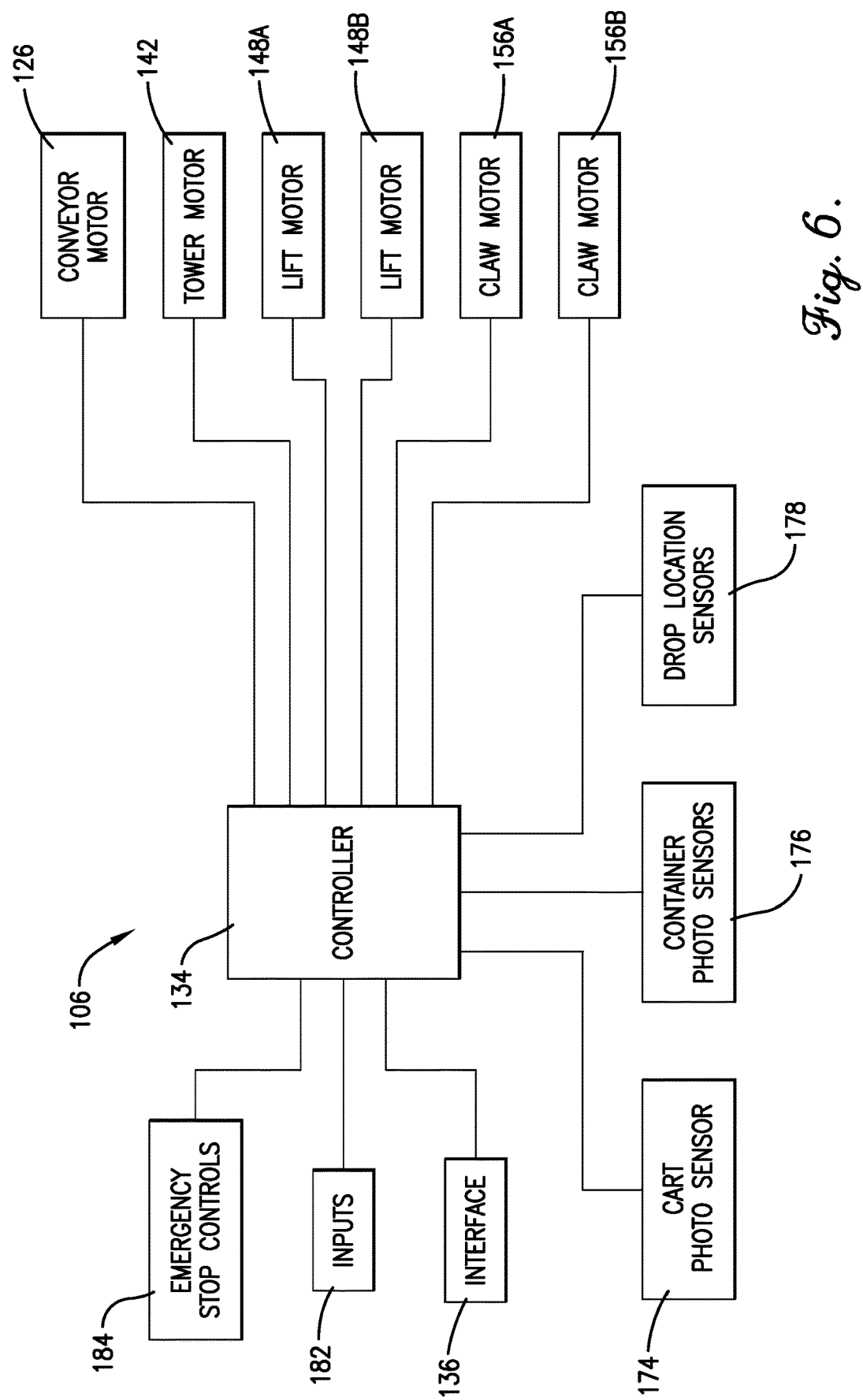
FIG. 6 is a schematic diagram of certain components of the automated de-stacking system of FIG. 1.

Turning to FIG. 6, the control system 106 may comprise a programmable logic controller (PLC) 134 and a human machine interface (HMI) 136 for operating the de-stacking system 100. The control system 106 may also include wired or wireless communication elements for communicating with remote servers, control systems of other de-stacking systems or other material manipulation systems, or with user work devices.

The controller 134 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The controller 120A may generally execute, process, or run instructions, code, code segments, code statements, software, firmware, programs, applications, apps, processes, services, daemons, or the like. The controller 134 may also include hardware components such as registers, finite-state machines, sequential and combinational logic, configurable logic blocks, and other electronic circuits that can perform the functions necessary for the operation of the current invention. In certain embodiments, the controller 134 may include multiple computational components and functional blocks that are packaged separately but function as a single unit. The controller 134 may be in electronic communication with the other electronic components through serial or parallel links that include universal busses, address busses, data busses, control lines, and the like.

The controller 134 may include, perhaps as an embedded device or an integrated device, or be in electronic communication with, a memory element. The memory element may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the controller. The memory element may include, or may constitute, a non-transitory "computer-readable medium." The memory element may store the instructions, code, code statements, code segments, software, firmware, programs, applications, apps, services, daemons, or the like that are executed by the controller. The memory element may also store data that is received by the controller 134 or the de-stacking system 100 in which the controller 134 is implemented. The memory element may further store data or intermediate results generated during processing, calculations, and/or computations as well as data or final results after processing, calculations, and/or computations. In addition, the memory element may store settings, data, documents, sound files, photographs, movies, images, databases, and the like.

The communication elements may include signal and/or data transmitting and receiving circuits, such as antennas, amplifiers, filters, mixers, oscillators, digital signal processors (DSPs), and the like. The communication elements may establish communication with other computing devices wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof.

The interface 136 may allow users to program, control, service, and troubleshoot the de-stacking system 100. To that end, the interface 136 may include a display that depicts pertinent information and indicators as to the status of an operation cycle of the de-stacking system 100, data and messages including error messages, input buttons and other controls, and the like. The interface 136 may also present various modes such as a machine parameter mode, a servo control mode, a test mode, and initial setup mode that requires special credentials (e.g., a password or key) for authorized access. Such modes may present additional inputs or prompts for programming, control, or troubleshooting.

Within the servo control mode, the de-stacking system 100 can be set to certain sub-modes such as auto, off, and manual. For example, in manual mode, a vertical axis can be jogged up or down, and a horizontal axis can be rotated clockwise or counterclockwise. Other parameters and values that can be set may include a homing axis, speed ratios, side disable on/off, and the like.

The robotic assembly 108 is operable to transfer containers 200 between the container stack and the conveyor 104. Lift assembly 110 of the robotic assembly 108 supports both of the grabber assemblies 112A,B and includes a base 138, a rotatable tower 140, and a motor 142 configured to rotate the tower 140 relative to the base 138 about a vertical axis.

The tower 140 includes a pair of upright tracks 144 located on opposite sides of the tower 140 to slidably engage respective grabber assemblies 112A,B. In particular, the tracks 144 permit the grabber assemblies 112A,B to slide vertically relative to the tower 140 for raising and lowering the grabber assemblies 112A,B. The tower 140 also includes chain drives 146A,B associated with each of the tracks 144 to drivingly shift the grabber assemblies 112A,B along the respective tracks 144. Each chain drive may include a motor 148 to power a respective chain and thereby position the corresponding grabber assembly. However, it is within the ambit of at least certain aspects of the present invention for the system to include an alternative lift assembly for vertically shifting at least one of the grabber assemblies 112A,B. The tower 140 (along with the grabber assemblies 112A,B) is configured to rotate about a vertically-extending axis via the motor 142.

Each grabber assembly 112A,B is preferably used to selectively engage and disengage containers 200 during operation and may be substantially similar to each other. Grabber assembly 112A will be described in more detail. The grabber assembly 112A includes a cantilevered support arm 150 slidably attached to one of the tracks 144 of the tower 140. The grabber assembly 112A also includes laterally extending claw supports 152, claws 154 pivotally attached adjacent to respective ends of the claw supports 152, a motor 156, right angle gearbox 158, and linkage 160.

Each claw 154 includes a pair of claw elements 162 with inwardly-turned hooks 164 located at a lowermost end of the claw 154 to engage a container. An uppermost end of the claw 154 is pivotally attached to the linkage 160 and is pivotally attached to the claw support 152 at a location spaced between the uppermost and lowermost ends. The uppermost end is configured to be laterally shifted by the linkage 160 to produce corresponding lateral shifting of the lowermost claw end.

The linkage 160 preferably includes a rotatable drive wheel 166 attached to an output shaft of the gearbox 158 and a pair of links 168 drivingly attached to the drive wheel 166. Rotation of the drive wheel 166 in one direction causes both sets of claws 154 to shift simultaneously so that the claws 154 are closed to engage a container. Rotation of the drive wheel 166 in the opposite direction causes both sets of claws 154 to shift simultaneously so that the claws 154 are opened for disengagement from a container. The linkage 160 and claws 154 may be non-backdrivable so that the claws 154 can only be actuated via specific commands to the motor 156 or other components. To that end, the grabber assemblies 112A,B may include ratchet mechanisms, locking components, detents, or the like. Similarly, the gearbox 158 may include a worm gear that can only turn via motor input. This prevents slippage and inadvertent, unauthorized, or premature release of the container.

For at least certain aspects of the present invention, the claws 154 may be alternatively configured to engage the container. For instance, alternative embodiments of the grabber assembly 112A may be configured to grab more than one container at a time (e.g., where the claws 154 are configured to engage multiple stacked containers).

While the robotic assembly 108 preferably includes a pair of grabber assemblies 112A,B, it is within the ambit of at least certain aspects of the present invention for the system to include an alternative number of grabber assemblies. For instance, alternative system embodiments may include a single grabber assembly or more than two grabber assemblies (e.g., where more than two grabber assemblies are supported by the lift assembly 110).

Robotic assembly 108 preferably defines a docking station 170 configured to receive the container cart 202 with a stack of nested containers 200. The robotic assembly 108 may also defines a plurality of drop locations spaced about the base 138 of the robotic assembly 108. The system is configured so that a conveyor may be located at any one of the drop locations to receive individual containers 200.

The de-stacking system 100 preferably includes sensors that operably communicate with the controller for sensing location and/or movement of various system components and providing corresponding data to the controller, as best seen in FIG. 6. In the depicted embodiment, the system preferably includes a cart photo sensor 174 adjacent the docking station 170 to sense whether the container cart 202 in position for container removal. The system also includes container photo sensors 176 adjacent the docking station 170 to sense the number of containers 200 nested in a container stack on the cart 202. The system further includes drop location sensors 178 adjacent to each drop location to sense whether a container is positioned on the conveyor 104 at the drop location. The sensors 174, 176, 178 may include at least one of photo sensors, pressure sensors, light sensors, proximity sensors, motion sensors, and the like.

The motors 126, 142, 148, 156 may be electric motors for driving various components of the robotic assembly 108 and each may be for example a servo motor with an absolute encoder. In one embodiment, the robotic assembly 108 is devoid of any pneumatically powered motors. Importantly, the de-stacking system 100 (and the electric motors in particular) is configured to be operated in a refrigerated environment (e.g., 28 degrees Fahrenheit/−2.2 degrees Celsius or lower) without being prone to failure, unlike pneumatically powered motors. However, for at least certain aspects of the present invention, one or more motors may be alternatively configured.

In operation, the de-stacking system 100 is configured to sense the location of the container cart 202 and any containers 200 located on the cart 202. If the system determines that the cart 202 and containers 200 are located in the docking station 170, the HMI will depict indicia (e.g., LED indicators) confirming the locations of the cart 202 and containers 200. The controller will also permit the de-stacking system 100 to proceed to the step of de-nesting the stacked containers 200, provided that other conditions for the de-nesting operation are satisfied.

The de-stacking system 100 also confirms that the cage door is closed and that no emergency stop buttons/switches are engaged. If so, the controller will permit the de-stacking system 100 to proceed to the step of de-nesting the stacked containers 200, provided that other conditions for the de-nesting operation are satisfied.

During the step of de-nesting the stacked containers 200, the robotic assembly 108 is operated by the controller to pick up each of the containers 200 one at a time and shift each container onto the conveyor 104. In the depicted embodiment, the robotic assembly 108 uses one of the grabber assemblies 112A,B to engage and grab an uppermost one of the stacked containers 200 by cooperatively closing the claws 154 onto the container. With the claws 154 engaged, the robotic assembly 108 is permitted to lift the uppermost container from the stack. The lift assembly 110 may rotate the tower 140 and grabber assemblies 112A,B about the vertical axis so that the engaged container is shifted to a position above the conveyor 104 at the drop location 172. The robotic assembly 108 may be selectively lowered onto the conveyor 104 by the respective grabber assembly and the claws 154 opened to release the container from the grabber assembly.

Each of the grabber assemblies 112A,B is configured to selectively grab a respective container from the stack, shift the container over to the drop location 172, and release the container onto the conveyor 104. In the depicted embodiment, the grabber assemblies 112A,B are preferably on opposite sides of the tower 140. Similarly, the docking station 170 and drop location 172 are also on opposite sides of the tower 140. As a result, when the first grabber assembly 112A is located in the docking station 170 to engage and lift a first container, the second grabber assembly 112B is located in the drop location 172 to lower and release a second container onto the conveyor 104. The robotic assembly 108 may then be operated to rotate the tower 140 so that the first grabber assembly 112A and first container are located in the drop location 172, while the second grabber assembly 112B is returned to the docking station 170 to engage a third container. The robotic assembly 108 may then operate the second grabber assembly 112B in the docking station 170 to engage and lift the third container, while the first grabber assembly 112A is operated in the drop location 172 to lower and release the first container onto the conveyor 104. The robotic assembly 108 may then be operated to rotate the tower 140 so that the second grabber assembly 112B and third container are located in the drop location 172, while the first grabber assembly 112A is returned to the docking station 170 to engage a fourth container. The above steps may be repeated to continue removing containers 200 from the stack and shifting the containers 200 onto the conveyor 104 until the stack is empty. Upon removal of all containers 200 from the stack, the system will preferably stop the operating cycle (e.g., so that another stack of containers 200 may be positioned in the docking station 170).

If a container is dropped or improperly grabbed by one of the grabber assemblies 112A,B (e.g., because the container and/or system is damaged), the system may stop the operating cycle so that the system error may be safely investigated and resolved.

For at least certain aspects of the present invention, the de-stacking system 100 and process may be configured so that the de-stacking system 100 is operable to collect individual containers 200 from the conveyor 104 and position them to form a stack of nested containers 200. Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

Additional Considerations

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the scope of the present invention.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, structure, act, etc. described in one embodiment may also be included in other embodiments but is not necessarily included. Thus, particular implementations of the present invention can include a variety of combinations and/or integrations of the embodiments described herein.

Furthermore, directional references (e.g., top, bottom, front, back, side, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45°) angle relative to the axis but, because the element extends at least in part along the axis, it should still be considered axial. Similarly, the terms radial, radially, and variations thereof shall be interpreted to mean the element has at least some directional component in the radial direction relative to the axis.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although the disclosure has been described with reference to the embodiments illustrated in the attached figures, it is noted that equivalents may be employed, and substitutions made herein, without departing from the scope of the disclosure as recited in the claims.

The invention claimed is:

1. An automated system for de-stacking a plurality of stacked objects, the automated system comprising:
   a lift assembly comprising:
      a tower configured to rotate about a vertically-extending axis;
      a first electric motor drivably connected to the tower and configured to rotate the tower; and
      a second electric motor for a grabber assembly raising and lowering;
   a grabber assembly configured to move with the tower as the tower rotates and configured to be raised and lowered via the second electric motor, the grabber assembly comprising:
      a claw configured to grasp the objects individually; and
      a third electric motor drivably connected to the claw and configured to actuate the claw,
      the second electric motor being drivably connected to the grabber assembly and configured to raise and lower the grabber assembly,
   the first, second, and third electric motors being configured to operate in a refrigerated environment; and
   a conveyor positioned near the tower, the conveyor comprising:
      a belt configured to move objects placed on the conveyer away from the tower; and
      a fourth electric motor drivably connected to the belt and configured to advance the belt, the electric motor of the conveyer being configured to operate in the refrigerated environment,
   the conveyor further comprising a catch configured to reorient the objects after the objects have been placed on the belt.

2. An automated system for de-stacking a plurality of stacked objects, the automated system comprising:
   a lift assembly comprising:
      a tower configured to rotate about a vertically-extending axis;
      a first electric motor drivably connected to the tower and configured to rotate the tower; and
      a second electric motor for a grabber assembly raising and lowering;
   a grabber assembly configured to move with the tower as the tower rotates and configured to be raised and lowered via the second electric motor, the grabber assembly comprising:
      a claw configured to grasp the objects individually; and
      a third electric motor drivably connected to the claw and configured to actuate the claw,
      the second electric motor being drivably connected to the grabber assembly and configured to raise and lower the grabber assembly,
   the first, second, and third electric motors being configured to operate in a refrigerated environment;
   the grabber assembly being a first grabber assembly, the claw being a first claw, the automated system further comprising a second grabber assembly opposite the first grabber assembly, the second grabber assembly being configured to move with the tower as the tower rotates and comprising:
      a second claw configured to grasp the objects individually; and
      a fifth electric motor drivably connected to the second claw and configured to activate the claw,
   the lift assembly further comprising a sixth electric motor drivably connected to the second grabber assembly and configured to raise and lower the second grabber assembly independently from the first grabber assembly.

3. The automated system of claim 2, further comprising a conveyor positioned near the tower, the conveyor comprising:
   a belt configured to move objects placed on the conveyer away from the tower; and
   a fourth electric motor drivably connected to the belt and configured to advance the belt, the electric motor of the conveyer being configured to operate in the refrigerated environment.

4. The automated system of claim 3, further comprising a docking station near the tower opposite the conveyor, the docking station being configured to receive a cart supporting the objects to position the objects for engagement with the claw.

5. The automated system of claim 3, further comprising a control system configured to activate the first, second, and third, and fourth electric motors.

6. The automated system of claim 2, the plurality of objects being separately supported, the grabber assembly being configured to engage any one of the plurality of stacked objects and de-stack the one of the plurality of stacked objects from the remaining stacked objects.

7. The automated system of claim 2, the claw being configured to be shifted to a disengaged configuration only via actuation by the third electric motor.

8. The automated system of claim 2, further comprising a sensor configured to detect proper engagement of the claw with the objects.

9. The automated system of claim 2, further comprising a docking station near the tower and a sensor positioned near a docking station and configured to detect the presence of the stacked objects in the docking station.

10. An automated system for de-stacking a plurality of stacked objects, the automated system comprising:
    a lift assembly comprising:
       a tower configured to rotate about a vertically-extending axis;
       a first electric motor drivably connected to the tower and configured to rotate the tower; and
       a second electric motor for a grabber assembly raising and lowering; and
    a grabber assembly configured to move with the tower as the tower rotates and configured to be raised and lowered via the second electric motor, the grabber assembly comprising:
       a claw configured to grasp the objects individually; and
       a third electric motor drivably connected to the claw and configured to actuate the claw,
       the second electric motor being drivably connected to the grabber assembly and configured to raise and lower the grabber assembly;
    a conveyor positioned near the tower, the conveyor comprising:
       a belt configured to receive the stacked objects from the claw; and
       a fourth electric motor drivably connected to the belt to advance the belt; and
    a control system including a controller configured to activate the first, second, third, and fourth electric motors so that actuation of the belt is linked to operation of the lift assembly, the conveyor further comprising a catch configured to reorient the objects after the objects have been placed on the belt.

11. The automated system of claim 10, further comprising a docking station near the tower opposite the conveyor, the docking station being configured to receive a cart supporting the objects to position the objects for engagement with the claw.

12. The automated system of claim 11, the control system further comprising a sensor positioned near the docking station and configured to detect the presence of the stacked objects in the docking station.

13. The automated system of claim 10, the plurality of objects being separately supported, the grabber assembly being configured to engage any one of the plurality of stacked objects and de-stack the one of the plurality of stacked objects from the remaining stacked objects.

14. The automated system of claim 10, the claw being configured to be shifted to a disengaged configuration only via actuation by the third electric motor.

15. The automated system of claim 10, further comprising a sensor configured to detect proper engagement of the claw with the objects.

16. A method of de-stacking a plurality of stacked objects, the method comprising steps of:

lowering a grabber assembly toward one of the plurality of stacked objects via a first electric motor;

actuating a claw of the grabber assembly via a second electric motor so the claw grasps the one of the plurality of stacked objects;

raising the grabber assembly and hence raising the grasped object via the first electric motor;

rotating a tower including the grabber assembly to move the grabber assembly and hence the grasped object via a third electric motor;

lowering the grabber assembly and hence lowering the grasped object via the first electric motor toward a conveyor;

actuating the claw of the grabber assembly via the second electric motor so the claw releases the grasped object; and actuating the conveyor via a fourth electric motor once the claw has released the grasped object to move the released object along the conveyor, the first, second, third, and fourth electric motors being configured to operate in a refrigerated environment.

17. The method of claim 16, further comprising a step of detecting the plurality of stacked objects in a docking station near the tower via at least one of a cart photo sensor, a pressure sensor, a light sensor, a proximity sensor, and a motion sensor.

18. The method of claim 16, further comprising steps of detecting the claw has improperly or incorrectly grasped the grasped object and actuating the claw to release the grasped object.

\* \* \* \* \*